Oct. 13, 1959     E. K. KAPRELIAN     2,908,199
VARIABLE FOCAL LENGTH LENS SYSTEM

Filed May 3, 1957     2 Sheets-Sheet 1

INVENTOR.
Edward K. Kaprelian

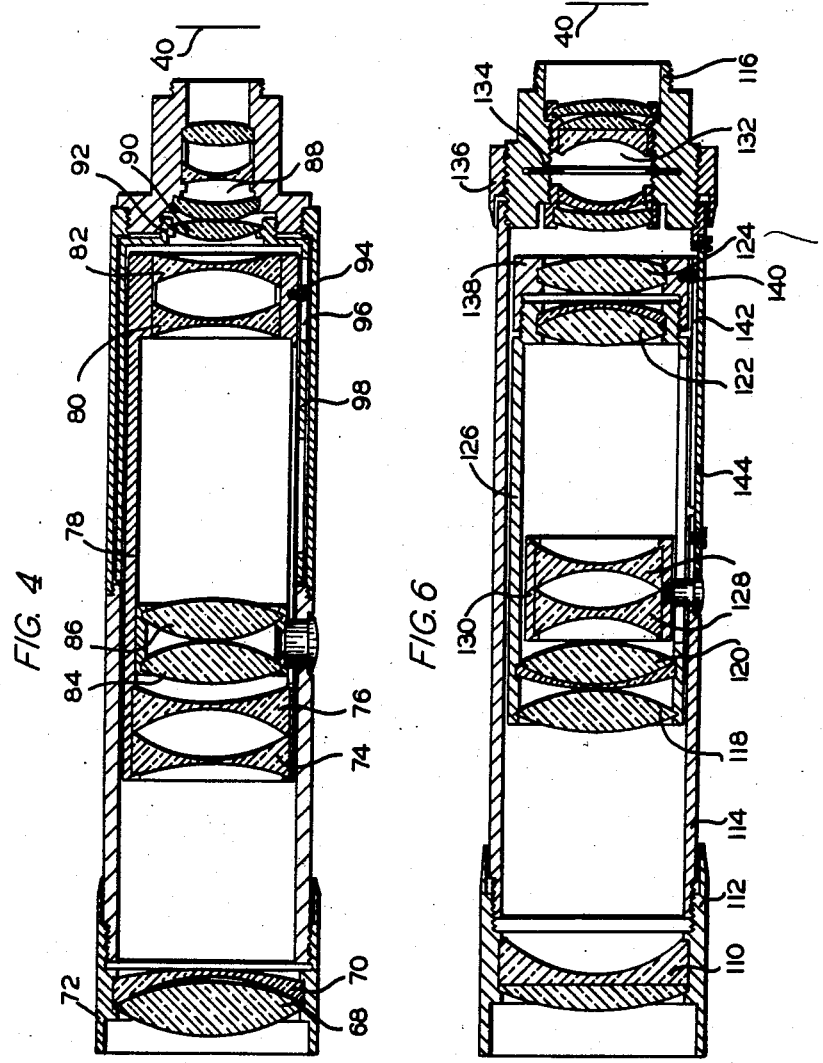

United States Patent Office 2,908,199
Patented Oct. 13, 1959

2,908,199

VARIABLE FOCAL LENGTH LENS SYSTEM

Edward K. Kaprelian, Weatogue, Conn.

Application May 3, 1957, Serial No. 656,852

6 Claims. (Cl. 88—57)

This invention relates to lenses in which the focal length may be varied to produce a change in magnification while the image remains in a given focal plane. These lenses, commonly known as zoom lenses, are widely employed with motion picture cameras and television cameras for achieving the impression of drawing close to and receding from the subject in the field of view, i.e., acting continuously to change characteristics from that of a telephoto lens to that of a normal angle or a wide angle lens, or vice versa, while permitting the camera to maintain a fixed distance from the subject. The flexibility of action achieved through the use of such a lens is advantageous in many motion picture and television activities ranging from the telecasting of sporting events to the filming of biological specimens through the microscope. Zoom lens systems are also applicable to uses other than that of a taking objective and can be employed as projection objectives, erectors, and eyepieces, for example, where they provide advantageous change in magnification or image size.

This change in focal length or magnification of a varifocal or zoom lens is usually achieved by internal shifting of power through the axial movement of two or more lens elements or groups, although other systems, such as those employing movable prisms, can be constructed. The properties which a zoom lens must possess in order to meet practical needs are those of maintaining the image plane at a constant position throughout the zoom action; maintaining the lens corrections throughout the zoom action; maintaining a constant relative aperture throughout the zoom action; possessing an adequately large relative aperture; and possessing the capability of a zoom range, or change in focal length, of at least 3 or 4 to 1.

Zoom lenses in the prior art have generally attempted to achieve these results in one of two ways. The earliest lenses utilized mechanical compensation, while more recently lenses employing optical compensation have been developed. Each type has its advantages and its limitations.

Mechanically compensated zoom objectives have two or more lens elements or groups, of which at least two must move relative to the film plane and relative to each other in order to maintain the image in focus while it changes size, i.e., during the zoom action. The mechanical movements must be very accurate and inasmuch as the action is non-linear, highly precise cams or lever arrangements must be employed. Such cams are difficult to fabricate, especially since they must match lenses whose characteristics vary because of manufacturing tolerances, and are also subject to wear in use, with the result that the exact relationship between the lenses is difficult to achieve and is almost impossible to maintain after prolonged use of the zoom lens. The principal advantage of the mechanically compensated lens lies in the fact that it possesses the theoretical capability of maintaining the image in exact focus throughout the entire zoom range.

Optically compensated zoom objectives have three or more lens elements or groups, at least two of which must be spaced apart and must move relative to the film plane and to a third, stationary lens element located between them, while the two spaced-apart lenses maintain a fixed space relationship with each other. The mechanical arrangement required in the optically compensated zoom objective is a simple one and ordinarily comprises a slidable barrel carrying the two spaced-apart lenses at either end and enclosing another sleeve or barrel which carries the fixed central lens. The principal disadvantage of this system lies in the fact that during the zoom action there are only a finite number of compensation points—either 3 or 4 in the usual system—where the image falls exactly on the desired image plane. At intermediate positions the image departs from the desired image plane to an extent depending upon the particular design. This deviation from the image plane increases with increase in zoom range and with increase in focal length.

One of the objects of this invention is to provide a zoom lens which is completely corrected for image plane deviation through the simultaneous utilization of both optical compensation and mechanical compensation.

Another object is to provide complete image compensation in a zoom lens without the employment of highly accurate cams, levers or other mechanical means for producing non linear motion.

Still another object of the invention is to employ an auxiliary compensating element moved by a cam of ordinary accuracy for eliminating the residual image movement in an optically compensated zoom lens.

These and other objects will become apparent in the attached drawing in which

Fig. 4 is an alternative embodiment in which an element of the relay lens is provided with a small non-linear movement.

Fig. 6 is another modification in which a portion of the rear movable lens is provided with an auxiliary non-linear movement.

Figure 1:
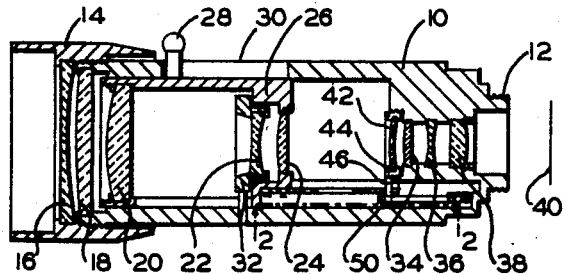
Fig. 1 shows schematically a variable focal length objective employing a low power non-linearly movable auxiliary compensating component for effecting correction of the residual image plane deviation.

The variable focal length lens shown in Fig. 1 comprises a main body or housing 10 provided with mounting threads 12 at one end and a focusing sleeve 14 at the other end. Movable lens 16 in sleeve 14 can be positioned at varying distances from fixed lens 18 for focusing on objects at different distances from the lens. Lenses 20, 22 and 24 comprise the zooming group whereby optical compensation for image deviation is achieved. Lenses 20 and 24, sometimes termed the variator lens and the compensator lens respectively, are mounted in fixed relationship to each other at each end of a sliding tube 26 provided with knob 28 or similar control handle operating through a slot 30 or equivalent. Lens 22, sometimes referred to as the erector lens is fixedly supported by mount 32 which is attached to the body 10 as shown.

Lenses 34, 36 and 38 together comprise a relay lens and are responsible for forming a final real image on the film plane 40.

Figure 2:
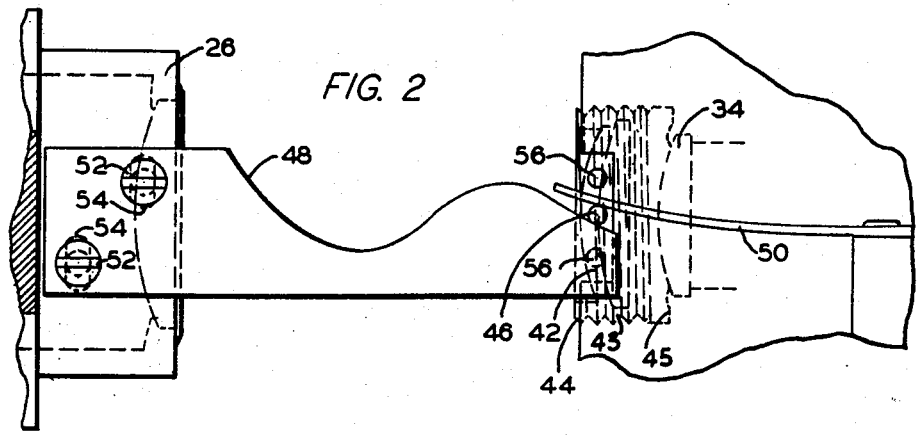
Fig. 2 is an enlarged view along line 2—2 of a part of the objective shown in Fig. 1.

Lens 42 is the auxiliary compensator and is carried in a mount 44 threaded as at 43 on its outer cylindrical surface and threadedly carried by threads in the recess 45 at the inner end of the bore receiving the relay lens group 34, 36, 38 in the main body 10. Pin 46 secured to the mount 44 moves on the surface of the cam 48 to axially advance and retract the auxiliary lens 42 relative to the lenses 20, 24 in the sliding tube 20 and the fixed lens 22 during adjustment of the lens system. This is shown in greater detail in Fig. 2, where it is also made clear that the cam action is made positive through the action of spring 50 which urges pin 46 against cam 48 at all times. Cam 48 is attached by means of screws 52 to the rear portion of sliding tube 26, slots 54 allowing for adjustment of cam 48. Pin 46 may be attached to mount 44 at the proper one of threaded holes 56 during initial assembly and adjustment.

Figure 3:
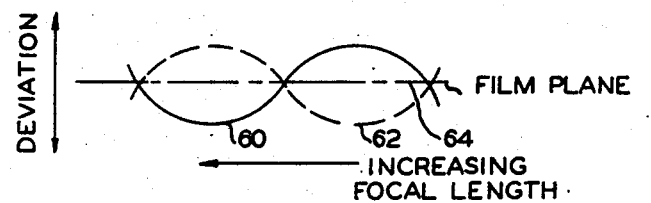
Fig. 3 is a diagram showing the effect of the auxiliary compensating component on the position of the image plane of the lens of Figs. 1 and 2.

The lens system as shown in Fig. 1 is in its telephoto or maximum focal length position. As tube 26 is moved to the right, or rear, of the system the focal length of the system becomes shorter and the lens covers a wider field of view. This action is achieved as follows: the object being photographed is seen by lens 20 at infinity or at a very great distance from the lens because of elements 16 and 18 which act essentially as a collimating pair. The image formed by lenses 20 and 22 lies a short distance in front of the zoom lens and changes both in size and position as tube 26 is moved. Lens 24 sees this image, and moving simultaneously with lens 20 forms another image, which in the absence of relay lens group 34—36—38 would be formed in back of the film plane. This second image varies in size with the zoom action but is relatively stationary in space. It is reimaged by the relay lens onto the film plane. Without the action of lens 42 the image would move away from film plane 40 during zooming as shown by the solid line 60 in Fig. 3, falling exactly on the film plane three times and being more or less out of focus at positions in between. The action of lens 42, when actuated by cam 48, is to move the image relative to the film plane as shown by dotted line 62 in Fig. 3. When the action of auxiliary compensation lens 42 is added to that of lens group 20—22—24 the image remains exactly in focus on the film plane at all zoom positions as shown by line 64. One result of such complete compensation is that very long focal length zoom lenses can be constructed. Previously, the deviation error in optically compensated lenses has been sufficiently high so that the magnification reduction factor of the relay lens was necessary in order to reduce the deviation. This resulted in a practical limit of focal lengths of 10 to 12 inches. The present system will allow construction of zoom lenses having focal length of 60 inches or greater.

Another result of the complete compensation achievable with this lens is the extension of the zoom range well beyond the present 3, 4 or 6 to 1. While the problem of the higher order aberrations may remain the limiting factor in extending zoom range, a range of 30 to 1 can be achieved by means of this invention as far as image compensation is concerned. The present invention also frees the designer from strict adherence to the rigid lens power relationships required for achieving compensation by purely optical means, thereby permitting somewhat more freedom in achieving aberration correction.

In accordance with the invention, the greatest part of the compensation for image deviation is achieved through the action of the optical compensation group 20—22—24 to reduce this deviation to approximately .002 to .0001 of the focal length of the lens, and the final compensation is achieved by the auxiliary compensation lens 42. An approximate indication of the relative amount of compensation contributed by the optical or primary compensator and by the auxiliary compensator can be seen in the product of power and displacement for the lenses involved. Lens 24 of Fig. 1 for example can have a power between 31 and 19 diopters and can move a total distance of from 0.9 inch to 1.3 inches, with a power-displacement range of from 17 diopter-inches to 40 diopter-inches. Lens 42 by contrast contributes its share of auxiliary compensation through a power-displacement range of from 0.01 diopter-inch to 0.1 diopter-inch, for example.

The advantage over the purely mechanically compensated lens lies in the greatly reduced requirement for accuracy in the non-linear movement of optical elements. Where the mechanically compensated lens must provide accuracy in positioning of a relatively high power element within .001 inch of true position over a travel of one inch or more, the present lens employs an element positioned by a cam whose surface need not be more accurate than approximately .010 inch over a .200 inch displacement or closer than .005 inch over a .100 inch displacement. In one specific example, auxiliary compensating lens 42 is rotated through 60 degrees with its .50 inch pitch thread mounted for a maximum displacement of .083 inch. A cam surface accuracy of ±.013 inch is adequate for maintaining lens 42 in its proper position; the positioning error due to the threads on mount 44 is negligible. Also where mechanically compensated lenses may require cams cut especially for each lens assembly, the cam used in this invention can be laid out once and for all and produced as a stamping; errors resulting from manufacturing tolerance for the optical elements themselves can be corrected by proper positioning of the cam.

It is not necessary to employ an additional lens to act as the auxiliary compensator. The conditions for correcting the residual deviations can be met by moving any one of several of the optical elements in the system, although certain elements lend themeselves for such utilization more favorably. One convenient element for movement is the first component of the relay lens. Other desirable components for effecting residual correcting are the central fixed lens, sometimes termed the erector, the front movable lens or variator, and the rear movable lens or compensator. Where these components comprise several separate elements, either the entire component or a part of it may be displaced.

Fig. 4 shows a modification in which lenses 68 and 70 set up the object for the zooming system and are held in an adjustable cell 72 to provide the means for focusing the entire objective for various distances. The variator group comprises two negative components 74 and 76 which may be either single or compound elements. These are mounted at one end of a movable tube 78 which carries at its other end an identical pair of components 80 and 82 which act as the compensator lenses. Located between these movable groups is a fixed component comprising a pair of symmetrically related positive lenses 84 and 86 which may be single elements, as shown, or compound elements. Spaced rearwardly of lens 82 and carried by the lens mount is a relay lens 88 of the 4-piece modified triplet type. The front element 90 of this lens is axially displaceable in a mount 92 similar to that shown in connection with lens 42 of Figs. 1 and 2. A pin 94 on tube 78 is guided by a cam slot 96 in cylindrical cam 98 which is attached to and rotates mount 92. Tube 78 is moved forward and backward by means of a handle, not shown, to decrease and increase, respectively, the focal length. During this action pin 94 moves in suitably shaped slot 96 and rotates cam 98, thereby displacing mount 92 and lens 90 axially relative to the other lenses. The compensating action of lens 92 is similar to that of lens 42, except that because of its relatively high power it need be displaced only a few thousandths of an inch. The threads on mount 92 are accordingly of fine pitch and the lens mount need not be rotated more than 45 degrees by cam 98 for many applications.

Figure 5:
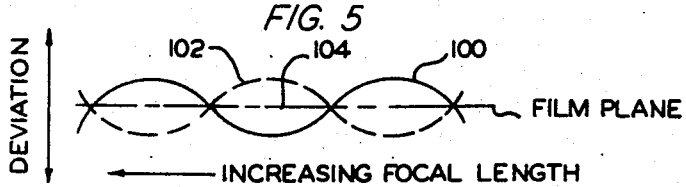
Fig. 5 is a diagram showing the effect of the compensating element on the position of the image plane of the lens of Fig. 4.

As shown by solid line 100 in Fig. 5, the system of Fig. 4 possesses 4 compensation points if the auxiliary action of lens 90 is omitted. The effect of the auxiliary action of this lens is shown by line 102 and the overall action of the entire system is shown at 104. As in the case of the lens of Figs. 1 and 2, the image remains on the film plane throughout the entire zoom range. Cam slot 96 possesses 4 nodes and in general shape is not unlike curve 100 of Fig. 5.

The modification of Fig. 6 also possesses four compensation points and employs as its front component a negative doublet 110 supported in focusing mount 112. Mount 112 is attached to the front end of main body 114 at the back end of which is the lens support means 116 to permit attachment to a camera or the like. The movable lens groups comprise a variator group 118 and 120, and a compensator group 122 and 124 mounted in sliding tube 126. These lenses are substantially symmetrical in power, radii, and spacing with respect to the center point of the tube, and are movable as a unit as in the case of corresponding elements in the other modifications. The fixed central lens component comprises a pair of negative lenses 128 which are also symmetrical with respect to their center point and are supported in mount 130 attached to main body 114.

The relay lens, designated generally as 132 is carried within support means 116 and is provided with the usual diaphragm blades 134 and diaphragm control ring 136.

Rear element 124 of the compensator group is supported in threaded mount 138 which permits relative displacement between this element and lens 122. This displacement is effected by the action of pin 140 riding on cam 142 which is supported by a cover plate 144 attached to the main body by screws or other suitable means.

In this modification the auxiliary compensation is achieved by imparting to the compensator lens 124 a non-linear component of displacement in addition to the linear movement provided by tube 126. The total compensation is complete for this modification, and the representation of Fig. 5 applies as well to this zoom lens.

It is obvious to those skilled in the art that the auxiliary compensation principle can be applied to other lens elements in the zoom system, and that other lens configurations can be employed, depending upon the manner in which corrections for aberrations are carried out in design.

I claim:

1. In a substantially completely compensated variable focal length lens system of the optically compensated class, an outer housing containing a plurality of lens components, a first lens component for focusing the system, a three component optical compensating lens group coaxial with said first component and comprising a first movable lens component, a second fixed component and a third movable component said first and third components being carried by an inner sliding tube for movement together and disposed one on each side of said fixed component, an operating member attached to said tube and projecting through a wall of said housing for imparting sliding motion to said tube, the linear axial movement of said first and third components relative to the second component producing a change in focal length of the optical compensating lens group accompanied by a residual image shift, an axially displaceable lens component movably mounted on said housing rearwardly of the third movable component and being movable non-linearly through the action of a cylindrical cam carried by the sliding tube upon linear movement of said sliding tube, said non-linear movement of said axially displaceable lens element introducing a counter image shift equal in magnitude and opposite in sign to said residual image shift.

2. In an objective lens of variable focal length comprising a plurality of fixed and movable lens components on a common axis, an outer housing, a coaxially movable tube held within said housing, an actuator passing through said housing for imparting linear movement to said tube, a pair of spaced-apart lens components of like optical sign carried at each end of said tube and movable linearly as a unit therewith, a fixed lens component of optical sign which is opposite to that of said spaced apart components fixedly attached to said outer housing, said fixed lens component being located between said spaced apart components and being coaxial therewith, a displaceable lens element located rearwardly of said spaced-apart lens components and mounted for movement along the optical axis, a cylindrical cam carried by said tube and movable therewith, the surface of said cam being non-linear, a follower actuated by said cam surface and connected to said displaceable lens whereby linear movement of said tube and spaced-apart lens components results in non-linear axial movement of said displaceable lens.

3. A variable focal length objective comprising an outer casing, a plurality of axially movable and axially fixed lens elements for varying focal length while maintaining an image plane fixed in space, said lens elements comprising in order, from the long conjugate end to the short conjugate end, a focusing component, a major compensation group, a minor compensation component, and a relay component, said major compensation group comprising a pair of spaced apart lenses of like sign held in a sliding tube within the casing and a fixed lens of opposite sign positioned between said pair of lenses and held by said casing, said minor compensation component comprising a lens element held within said casing by a mounting means which permits its movement axially, an operating member connected to said sliding tube and extending outwardly of said casing for sliding said tube, a cylindrical cam member carried by said tube, and a cam follower carried by said minor compensation component mounting means and resting on said cam member to thereby provide axial movement of said minor compensation component when said sliding tube is moved.

4. In an image compensated variable focal length objective wherein focal length is varied and the image position compensated so as to remain fixed in space through the action of fixed and axially movable coaxial lens elements, and wherein the focal length variation and image position compensation are functions of the power of the elements and the distance through which the movable elements are displaced: an outer housing for enclosing the lens elements, an inner tube axially slidable within said housing, a pair of spaced apart lens elements of like sign held within said tube, an element of opposite sign held fixedly to said housing and positioned between said pair of lenses, said pair of lenses being shiftable together in the same direction upon movement of said tube and providing by such movement in conjunction with said fixed lens the principal contribution to the power-displacement product for effecting focal length variation and substantially complete image movement compensation, cam means carried by said sliding tube, a cam follower driven by said cam and attached to an axially movable lens mount within said housing, a secondary compensation lens element carried by said lens mount, said cam being shaped to displace said secondary lens element non linearly during movement of said tube, displacement of said secondary lens element providing the small additional contribution to the total power-displacement product for correcting the small image movement caused by the displacement of said pair of movable elements.

5. In a dual compensated variable focal length optical system wherein the image plane is maintained in a fixed position in space throughout the entire range of focal length change and comprising axially aligned fixed and movable lens elements within an enclosing housing: an optical compensation lens group, and a mechanical compensation lens element, said optical compensation group comprising two spaced apart axially movable elements of like optical sign carried by an axially slidable mount within said housing, a third element of sign opposite to that of said movable elements fixed to said housing and positioned in the space between said movable elements, an operating member extending through said housing and fastened to said slidable mount for moving said mount to obtain a change in focal length over a given range while obtaining by such movement an exact positioning of the image in space for at least three settings throughout said range of focal length change with departure from exact positioning at intermediate settings, said mechanical compensation lens being supported within said housing on an axially movable mount, cam means carried by said slidable mount and operable upon movement of said slidable mount for simultaneously imparting a non-linear movement to said axially movable mechanical compensation lens mount, the power of said mechanical compensation lens element and the direction and amount of its movement being so selected as to provide shifting of the image plane an amount opposite in sign and equal to the departure introduced by said optical compensation group at said intermediate settings.

6. In a substantially completely compensated variable focal length lens system of the optically compensated class comprising a plurality of fixed and movable lens components on a common axis, an outer housing, an axially slidable mount held within said housing, an actuator operable from outside said housing for imparting linear movement to said mount, a first movable lens group of given optical sign held in said mount, a second movable lens group of the same optical sign held in said mount and spaced apart from said first movable lens group, said second movable lens group comprising two lens elements having a given spacing therebetween a lens cell movably connected to said lens mount, one of said two elements being held in said cell to allow a change in said spacing, a stationary lens group of sign opposite to said movable groups held fixedly to said housing and positioned between said movable groups, a non linear cam carried by said outer housing, a cam follower carried by said cell and driven by said cam, said cam imparting movement to said cell to alter the spacing between said two lens elements during linear movement of said mount.

References Cited in the file of this patent

UNITED STATES PATENTS

| | | |
|---|---|---|
| 2,159,394 | Mellor et al. | May 23, 1939 |
| 2,165,341 | Capstaff | July 11, 1939 |
| 2,454,686 | Back | Nov. 23, 1948 |
| 2,515,104 | Walker | July 11, 1950 |
| 2,532,685 | Walker | Dec. 11, 1950 |
| 2,566,485 | Cuvillier | Sept. 4, 1951 |
| 2,663,223 | Hopkins | Dec. 22, 1953 |
| 2,718,817 | Back et al. | Sept. 27, 1955 |
| 2,741,947 | Back | Apr. 17, 1956 |
| 2,778,272 | Reymond | Jan. 22, 1957 |
| 2,782,684 | Hopkins | Feb. 26, 1957 |